US012401593B2

United States Patent
(12)

Gautam et al.

(10) Patent No.: US 12,401,593 B2
(45) Date of Patent: Aug. 26, 2025

(54) SYSTEM AND METHOD FOR AVOIDING CONGESTION IN A LOAD BALANCED NETWORK

(71) Applicant: CIENA CORPORATION, Hanover, MD (US)

(72) Inventors: Vineet Gautam, Gurugram (IN); Mohit Chhillar, Delhi (IN); Rajagopalan Kannan, Gurgaon (IN)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/462,511

(22) Filed: Sep. 7, 2023

(65) Prior Publication Data

US 2025/0039095 A1 Jan. 30, 2025

(30) Foreign Application Priority Data

Jul. 27, 2023 (IN) ............................ 202311050632

(51) Int. Cl.

| | |
|---|---|
| ***H04L 47/125*** | (2022.01) |
| ***H04L 45/02*** | (2022.01) |
| ***H04L 47/127*** | (2022.01) |

(52) U.S. Cl.

CPC ............ *H04L 47/125* (2013.01); *H04L 45/02* (2013.01); *H04L 47/127* (2013.01)

(58) Field of Classification Search

None

See application file for complete search history.

(56) References Cited

U.S. PATENT DOCUMENTS

| | | | | |
|---|---|---|---|---|
| 9,559,985 | B1 | 1/2017 | Ye et al. | |
| 10,178,021 | B1 * | 1/2019 | Devillard | H04L 45/04 |
| 2005/0232157 | A1 * | 10/2005 | Tyan | H04L 45/62 709/239 |
| 2016/0149816 | A1 * | 5/2016 | Wu | H04L 45/28 370/235 |

(Continued)

OTHER PUBLICATIONS

Zhang, Junjie , et al., "Optimizing Network Performance using Weighted Multipath Routing", Polytechnic Institute of New York University, UAE University, 978-1-4673-1544 IEEE, 8 pp, Sep. 12, 2012.

(Continued)

*Primary Examiner* — Fadi Haj Said

(74) *Attorney, Agent, or Firm* — Guntin & Gust, PLC; Robert Gingher

(57) ABSTRACT

Aspects of the subject disclosure may include, for example, a method of registering a first service in a network comprising a plurality of nodes, wherein the first service comprises a plurality of routes between a source node and a destination node, and wherein the registering comprises creating a first table of weights for a first distribution of traffic among the plurality of routes in the first service; registering a second service in the network including a second table of weights for a second distribution of traffic among a second plurality of routes for the second service; determining whether a fault on a link in the network would create congestion in the first plurality of routes and the second plurality of routes; and modifying the first table of weights or the second table of weights responsive to determining the congestion. Other embodiments are disclosed.

20 Claims, 13 Drawing Sheets

(56) References Cited

U.S. PATENT DOCUMENTS

2020/0389404 A1 12/2020 Wu et al.
2022/0417139 A1* 12/2022 Brar ...................... H04L 45/745
2023/0164080 A1 5/2023 Du et al.

OTHER PUBLICATIONS

Extended European Search Report for EP24188435.2 mailed Nov. 25, 2024, 20 pp.

* cited by examiner

100

100

100

201A

| Link Fault | Weights | Data |
| --- | --- | --- |
| Initial State | P1 – 25%<br>P2 – 25%<br>P3 – 25%<br>P4 – 25% | P1 – 500M<br>P2 – 500M<br>P3 – 500M<br>P4 – 500M |
| P1 | P2 – 33%<br>P3 – 33%<br>P4 – 33% | P2 – 666M<br>P3 – 666M<br>P4 – 666M |
| P2 | P1 – 33%<br>P3 – 33%<br>P4 – 33% | P1 – 666M<br>P3 – 666M<br>P4 – 666M |
| P3 | P1 – 33%<br>P2 – 33%<br>P4 – 33% | P1 – 666M<br>P2 – 666M<br>P4 – 666M |
| P4 | P1 – 33%<br>P2 – 33%<br>P3 – 33% | P1 – 666M<br>P2 – 666M<br>P3 – 666M |

202

| Link Fault | Weights | Data |
| --- | --- | --- |
| Initial State | P7 – 33%<br>P8 – 33%<br>P9 – 33% | P7 – 666M<br>P8 – 666M<br>P9 – 666M |
| P7 | P8 – 50%<br>P9 – 50% | P8 – 1G<br>P9 – 1G |
| P8 | P7 – 50%<br>P9 – 50% | P7 – 1G<br>P9 – 1G |
| P9 | P7 – 50%<br>P8 – 50% | P7 – 1G<br>P8 – 1G |

| Link Fault | Weights | Data |
| --- | --- | --- |
| Initial State | P1 – 25%<br>P2 – 25%<br>P3 – 25%<br>P4 – 25% | P1 – 500M<br>P2 – 500M<br>P3 – 500M<br>P4 – 500M |
| P1 | P2 – 37.5%<br>P3 – 37.5%<br>P4 – 25% | P2 – 750M<br>P3 – 750M<br>P4 – 500M |
| P2 | P1 – 37.5%<br>P3 – 37.5%<br>P4 – 25% | P1 – 750M<br>P3 – 750M<br>P4 – 500M |
| P3 | P1 – 37.5%<br>P2 – 37.5%<br>P4 – 25% | P1 – 750M<br>P2 – 750M<br>P4 – 500M |
| P4 | P1 – 33%<br>P2 – 33%<br>P3 – 33% | P1 – 666M<br>P2 – 666M<br>P3 – 666M |

204

| Link Fault | Weights | Data |
| --- | --- | --- |
| Initial State | P7 – 33%<br>P8 – 33%<br>P9 – 33% | P7 – 166M<br>P8 – 166M<br>P9 – 166M |
| P7 | P8 – 50%<br>P9 – 50% | P8 – 250M<br>P9 – 250M |
| P8 | P7 – 50%<br>P9 – 50% | P7 – 250M<br>P9 – 250M |
| P9 | P7 – 50%<br>P8 – 50% | P7 – 250M<br>P8 – 250M |

| Link Fault | Weights | Data |
|---|---|---|
| Initial State | P7 – 33%<br>P8 – 33%<br>P9 – 33% | P7 – 1166M<br>P8 – 1166M<br>P9 – 1166M |
| P7 | P8 – 78%<br>P9 – 22% | P8 – 2.75G<br>P9 – 750M |
| P8 | P7 – 21.5%<br>P9 – 21.5%<br>P11 – 57% | P7 – 750M<br>P9 – 750M<br>P11 – 2G |
| P9 | P7 – 22%<br>P8 – 78% | P7 – 750M<br>P8 – 2.75G |

SYSTEM AND METHOD FOR AVOIDING CONGESTION IN A LOAD BALANCED NETWORK

CROSS-REFERENCE TO RELATED APPLICATIONS

This application claims priority under 35 U.S.C. § 1.119 to Indian patent application No. 202311050632, filed on Jul. 27, 2023. All sections of the aforementioned application(s) and/or patent(s) are incorporated herein by reference in their entirety.

FIELD OF THE DISCLOSURE

The subject disclosure relates to a system and method for avoiding congestion in a load balanced network.

BACKGROUND

Equal Cost Multipath Routing (ECMP) is a routing technique used in networks to distribute traffic across multiple paths with the same cost or metric. ECMP allows for efficient load balancing and improved network performance by utilizing all available paths simultaneously. However, when ECMP is used to load balance traffic, the traffic may be inefficiently distributed, especially when network faults occur. This is because the network may have a non-homogeneous traffic distribution across links, best path calculation, or other concerns. Weighted ECMP faces a similar problem since the weights are not dynamically determined. Current implementations by chipset manufacturers include static pre-configured weights for distribution. Weighted ECMP does not take into consideration network events when distributing the traffic. Static pre-configured weights or no weights result in uncontrolled congestion in the network on faults and service quality degradation.

BRIEF DESCRIPTION OF THE DRAWINGS

Reference will now be made to the accompanying drawings, which are not necessarily drawn to scale, and wherein:

FIG. 2A is a block diagram illustrating an exemplary, non-limiting embodiment of a method for avoiding congestion in a load balanced network functioning in accordance with various aspects described herein.

FIG. 2B is a block diagram illustrating an exemplary, non-limiting embodiment of a method for avoiding congestion in a load balanced network functioning in accordance with various aspects described herein.

FIG. 2C is a block diagram illustrating an exemplary, non-limiting embodiment of a method for avoiding congestion in a load balanced network functioning in accordance with various aspects described herein.

DETAILED DESCRIPTION

Figure 1A:
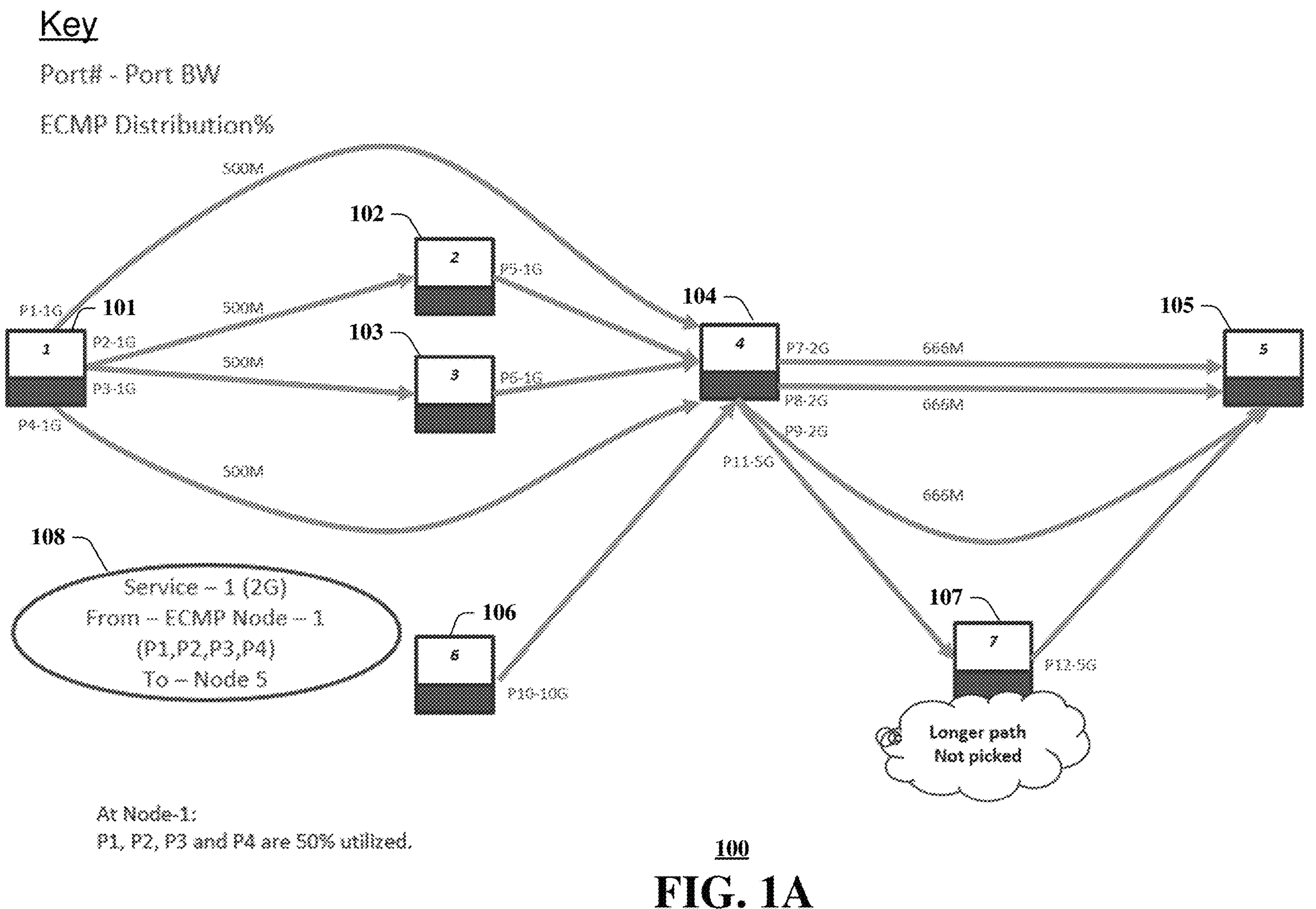
FIG. 1A is a block diagram illustrating an exemplary, non-limiting embodiment of a first service in a network functioning in accordance with various aspects described herein.

The subject disclosure describes, among other things, illustrative embodiments for a system and method for avoiding congestion in a load balanced network. Other embodiments are described in the subject disclosure.

One or more aspects of the subject disclosure include a method of registering, by a processing system including a processor, a first service in a network comprising a plurality of nodes, wherein the first service comprises a plurality of routes between a source node and a destination node, and wherein the registering comprises creating a first table of weights for a first distribution of traffic among the plurality of routes in the first service; registering, by the processing system, a second service in the network including a second table of weights for a second distribution of traffic among a second plurality of routes for the second service; determining, by the processing system, whether a fault on a link in the network would create potential congestion in the first plurality of routes and the second plurality of routes; and modifying the first table of weights or the second table of weights responsive to determining the potential congestion.

One or more aspects of the subject disclosure include a network controller having a processing system including a processor and executable instructions that, when executed by the processing system, facilitate performance of operations, including registering a first service in a network comprising a plurality of nodes, wherein the first service comprises a plurality of routes between a source node and a destination node, and wherein the registering includes creating a first table of weights for a first distribution of traffic among the plurality of routes in the first service; registering a second service in the network including a second table of weights for a second distribution of traffic among a second plurality of routes for the second service; determining whether a fault on a link in the network would create potential congestion in the first plurality of routes and the second plurality of routes; and modifying the first table of weights or the second table of weights responsive to determining the potential congestion.

One or more aspects of the subject disclosure include a non-transitory machine-readable medium, with executable instructions that, when executed by a processing system including a processor, facilitate performance of operations, including: registering a first service in a network comprising a plurality of nodes, wherein the first service comprises a plurality of routes between a source node and a destination node, and wherein the registering includes creating a first table of weights for a first distribution of traffic among the plurality of routes in the first service; registering a second service in the network including a second table of weights for a second distribution of traffic among a second plurality of routes for the second service; determining whether a fault on a link in the network would create potential congestion in the first plurality of routes and the second plurality of routes; and modifying the first table of weights or the second table of weights responsive to determining the potential congestion.

ECMP operates at the network layer (Layer 3) of the TCP/IP model and can be used with various routing protocols, such as Open Shortest Path First (OSPF) or Border Gateway Protocol (BGP). ECMP is widely supported in modern network equipment and is commonly used in data centers, enterprise networks, and service provider networks to optimize traffic distribution and improve network efficiency.

In traditional routing protocols, such as Routing Information Protocol (RIP) or OSPF, a router may choose a single best path based on metrics like hop count, bandwidth, or delay. However, in scenarios where multiple paths have the same metrics, ECMP comes into play.

With ECMP, a centralized controller, known as a software defined networking (SDN) controller, may provide a router with multiple next-hop options for a given destination network, all having equal cost. When a packet arrives at the router, it examines the destination IP address and applies a hashing algorithm to select one of the available paths. The algorithm typically uses a combination of source and destination IP addresses, transport layer ports, and other packet fields to ensure that packets belonging to the same flow are consistently sent over the same path.

By distributing traffic across multiple paths, ECMP offers several benefits. ECMP allows for the distribution of traffic along multiple paths, preventing congestion on a single path and making better use of available network resources. ECMP provides network redundancy by allowing packets to be sent along alternative paths in the event of a link failure or network congestion. If one path becomes unavailable, traffic can be automatically rerouted through other available paths. By utilizing multiple paths, ECMP can increase overall network performance and reduce latency by effectively utilizing available bandwidth and avoiding bottlenecks. ECMP is scalable and can accommodate networks with a large number of routers and links. ECMP does not require complex configurations or additional protocols, making it relatively easy to implement.

FIG. 1A is a block diagram illustrating an exemplary, non-limiting embodiment of a first service in a network functioning in accordance with various aspects described herein. As shown in FIG. 1A, network 100 comprises a series of nodes 101-107 connected by a topology as illustrated. Each node may have one or more outgoing ports, as identified by a port number and a bandwidth capacity. For example, port 1 of node 101 comprises a bandwidth capacity of 1 Gbps.

A first service 108 of 2 Gbps of traffic is registered between node 101 and node 105 over a plurality of routes. The SDN controller divides traffic for the first service 108 into four equally sized bandwidths of 500 Mbps each out of ports 1-4 from node 101 to node 104, as shown in FIG. 1A. At node 104, the SDN controller divides the traffic into three equally sized bandwidths of 666 Mbps each from node 104 to node 105 out of ports 7-9, respectively. Each of the four ports 1-4 of node 101 are utilized at 50% capacity, and ports 7-9 are utilized at 33% capacity.

Figure 1B:
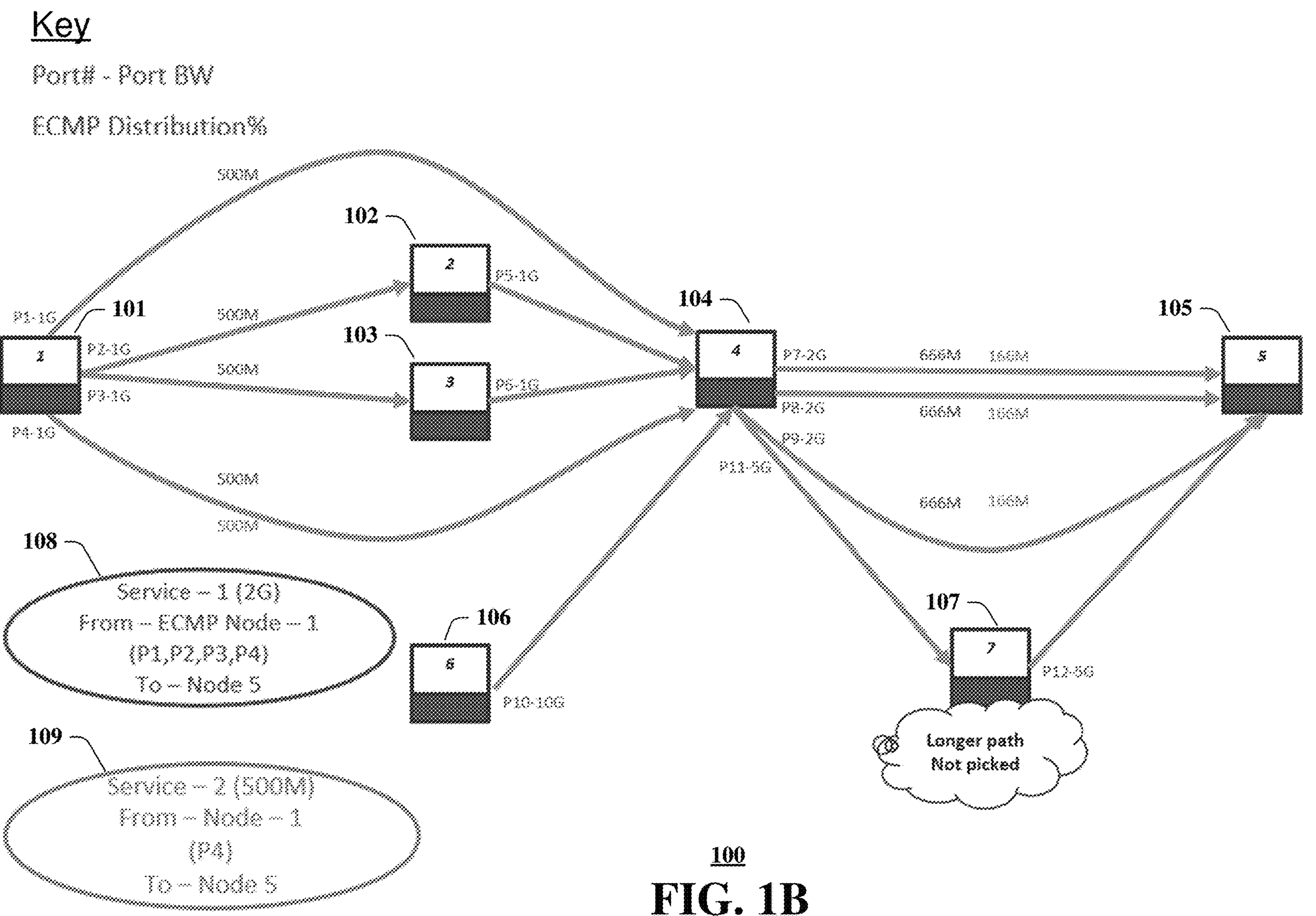
FIG. 1B is a block diagram illustrating an exemplary, non-limiting embodiment of a second service in a network functioning in accordance with various aspects described herein.

FIG. 1B is a block diagram illustrating an exemplary, non-limiting embodiment of a second service in a network functioning in accordance with various aspects described herein. As shown in FIG. 1B, the SDN controller registers a second service 109 between node 101 and node 105 having 500 Mbps of capacity. Traffic of the second service 109 is sent from node 101 out port 4 to node 104, then it is divided into three equally sized bandwidths of 166 Mbps each from node 104 to node 105 out of ports 7-9, respectively as shown in FIG. 1B. Now, port 4 of node 101 is utilized at 100% capacity, and ports 7-9 of node 104 are still utilized at less than 50% capacity.

Figure 1C:
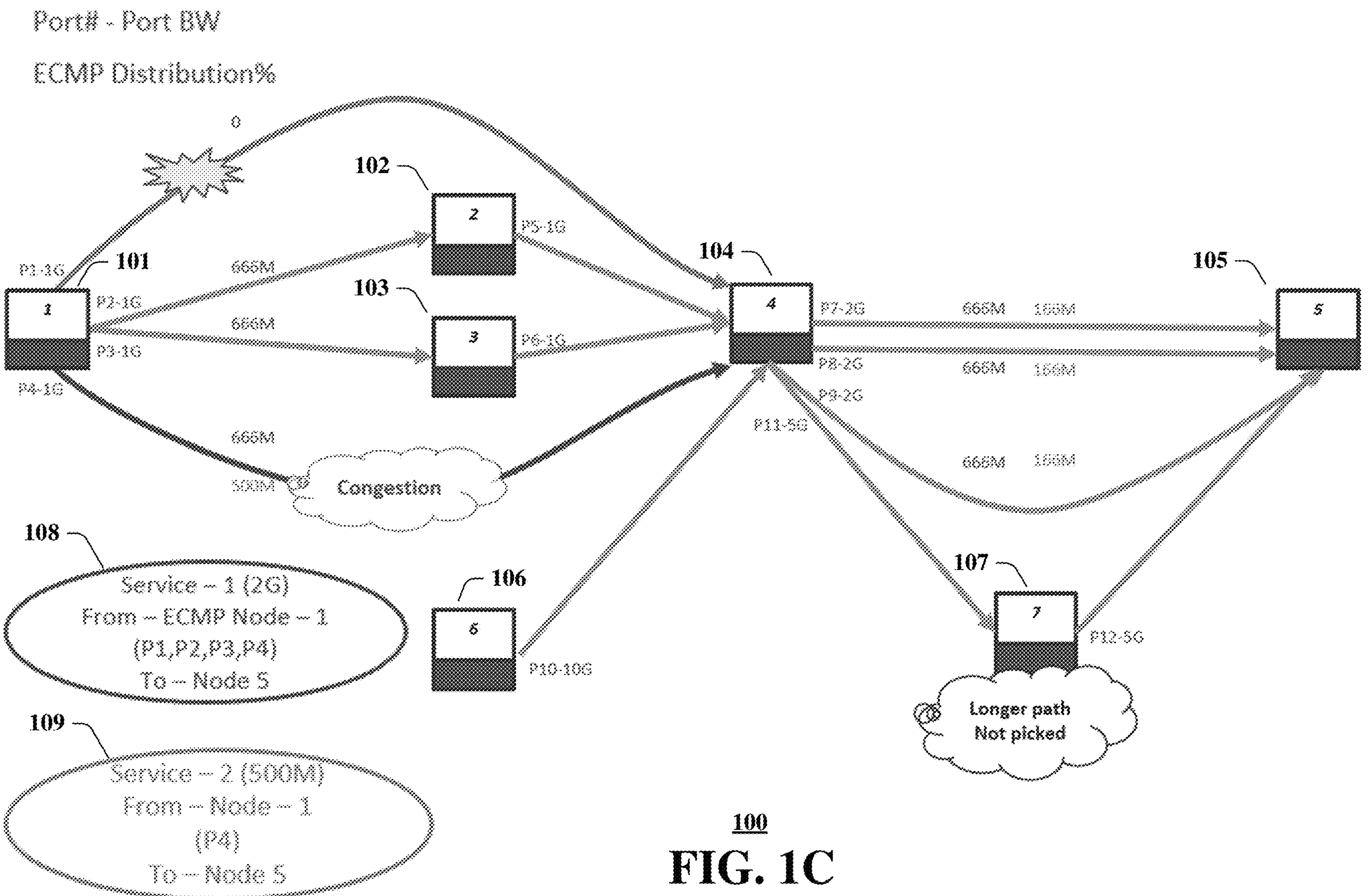
FIG. 1C is a block diagram illustrating an exemplary, non-limiting embodiment of congestion in a network functioning in accordance with various aspects described herein.

FIG. 1C is a block diagram illustrating an exemplary, non-limiting embodiment of congestion in a network functioning in accordance with various aspects described herein. As shown in FIG. 1C, a link connected to port 1 of node 101 fails, so the system redistributes the traffic routed out of node 101 equally across nodes 2-4. Traffic on each of nodes 2-4 is 666 Mbps. Traffic of the second service 109 is sent from node 101 out port 4 to node 104 is 500 Mbps. Hence, the total traffic out of node 101 on port 4 is 1166 Mbps, exceeding the capacity of port 4, which leads to congestion in both the first service and the second service, since port 4 is now overutilized.

Figure 1D:
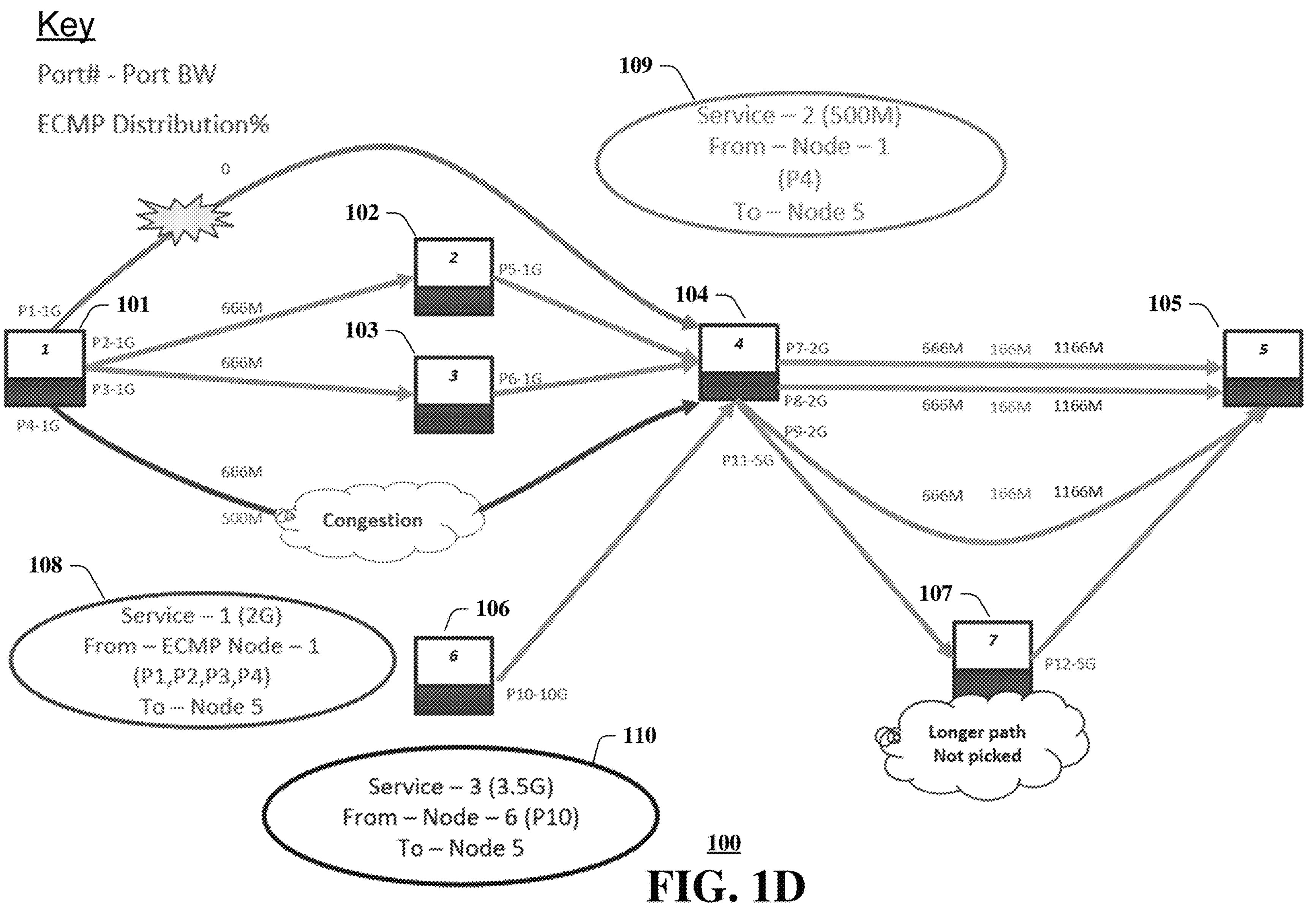
FIG. 1D is a block diagram illustrating an exemplary, non-limiting embodiment of a third service in a network with congestion functioning in accordance with various aspects described herein.

FIG. 1D is a block diagram illustrating an exemplary, non-limiting embodiment of a third service in a network with congestion functioning in accordance with various aspects described herein. As shown in FIG. 1D, a third service 110 is registered between node 106 and node 105 having 3.5 Gbps of capacity. Traffic of the third service 110 is sent from node 106 out of port 10 to node 104, then it is divided into three equally sized bandwidths of 1166 Mbps each from node 104 to node 105 out of ports 7-9, respectively as shown in FIG. 1D. Now, each of ports 7-9 of node 104 are utilized at 100% capacity.

Figure 1E:
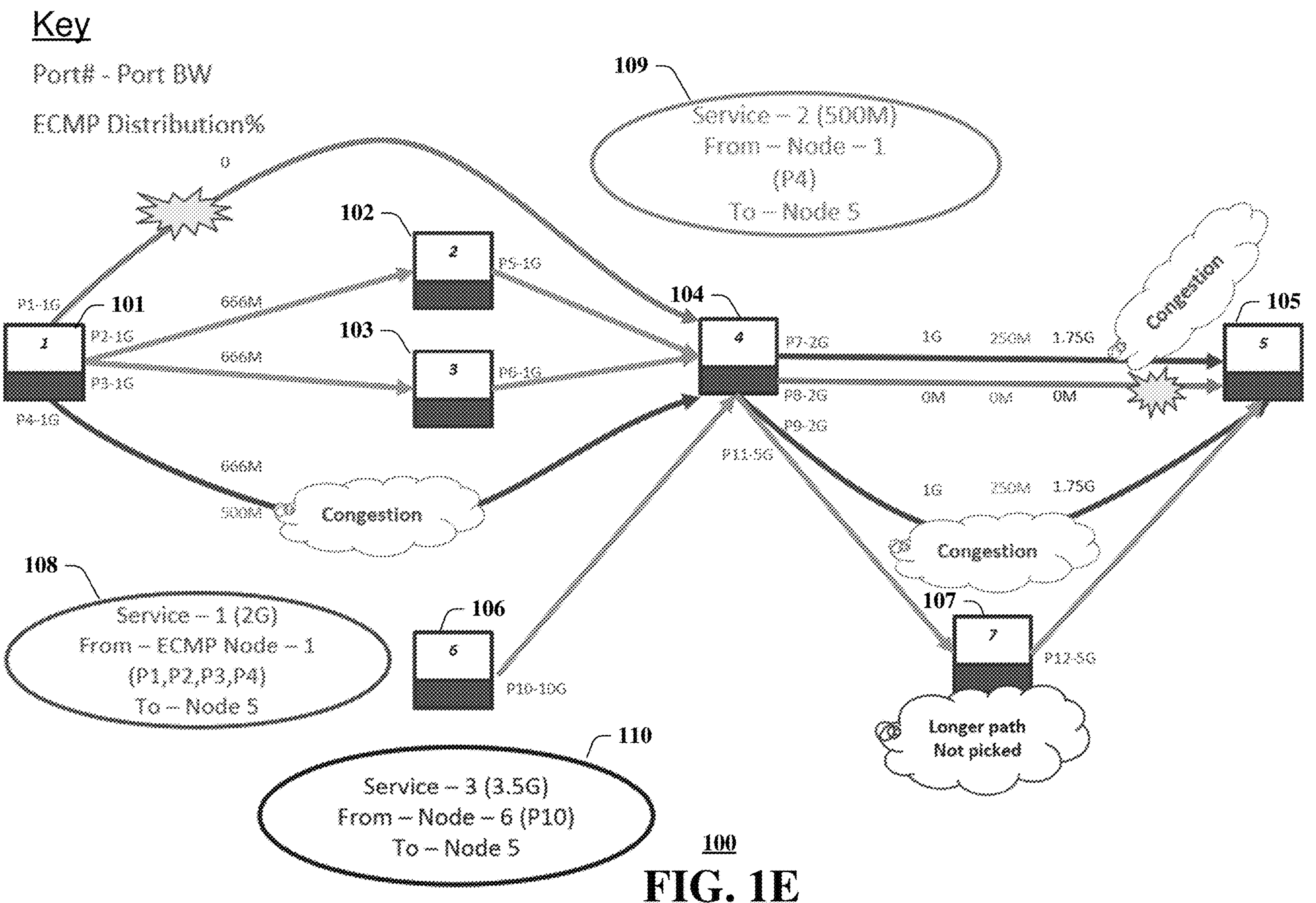
FIG. 1E is a block diagram illustrating an exemplary, non-limiting embodiment of congestion in a network functioning in accordance with various aspects described herein.

FIG. 1E is a block diagram illustrating an exemplary, non-limiting embodiment of congestion in a network functioning in accordance with various aspects described herein. As shown in FIG. 1E, the communication path of port 8 of node 104 fails, so the system redistributes the traffic of services 108, 109 and 110 routed out of node 104 equally on ports 7 and 9. Traffic from services 108, 109 and 110 on each of the ports is now 3 Gbps each, which exceeds the capacity of each of ports 7 and 9, which leads to congestion since ports 7 and 9 are now overutilized.

FIG. 2A is a block diagram illustrating an exemplary, non-limiting embodiment of a method for avoiding congestion in a load balanced network functioning in accordance with various aspects described herein. With reference to the network 100 shown in FIG. 1A, when the first service 108 is registered, in method 200 the SDN controller creates a table 201A and a table 202 for nodes 101 and node 104, respectively. As shown in FIG. 2A, each of table 201A and 202 comprises rows including an initial state, and a row for each port that may have a failure. For example, the initial state row of table 201 indicates that traffic for first service 108 will be equally distributed among ports 1-4, as shown by the 25% weights in the second column, and the data rates of 500 Mbps in the third column. Likewise, the initial state row of table 202 indicates that traffic for first service 108 will be equally distributed among ports 7-9, as shown by the 33% weights in the second column, and the data rates of 666 Mbps in the third column.

If a fault occurs on any outgoing port, the node will redistribute traffic for the first service 108 according to the respective row of the faulted port. As shown in FIG. 2A, since any faulted port will not lead to congestion, the traffic is equally redistributed to the remaining ports, as indicated by the equal weights and data rates of table 201A and table 202.

FIG. 2B is a block diagram illustrating an exemplary, non-limiting embodiment of a method for avoiding congestion in a load balanced network functioning in accordance with various aspects described herein. In method 203 the SDN controller takes into consideration a post-fault network view of network 100 to set ECMP weights for the network. On each ECMP node, the SDN controller determines how the network will better utilize BW in event of a link, port or node fault. Using this calculation, SDN pushes a table per node per service to act on every fault by updating the ECMP weights as per pre-computed data. The SDN controller maintains the overall view and ECMP weights as per node and port BW availability and cases the congestion avoidance at a node level.

With reference to the network 100 shown in FIG. 1B, when the second service 109 is registered, method 203 creates a table 204 for second service 109 at node 104, illustrated in FIG. 2B. Also as shown in FIG. 2B, method 203 modifies table 201A, now shown as table 201B, to avoid the congestion on port 4 illustrated in FIG. 1C in the event of a failure of any of ports 1-3. This puts the run-time post-fault view intelligence in the otherwise static configuration of the ECMP weights.

Figure 3A:
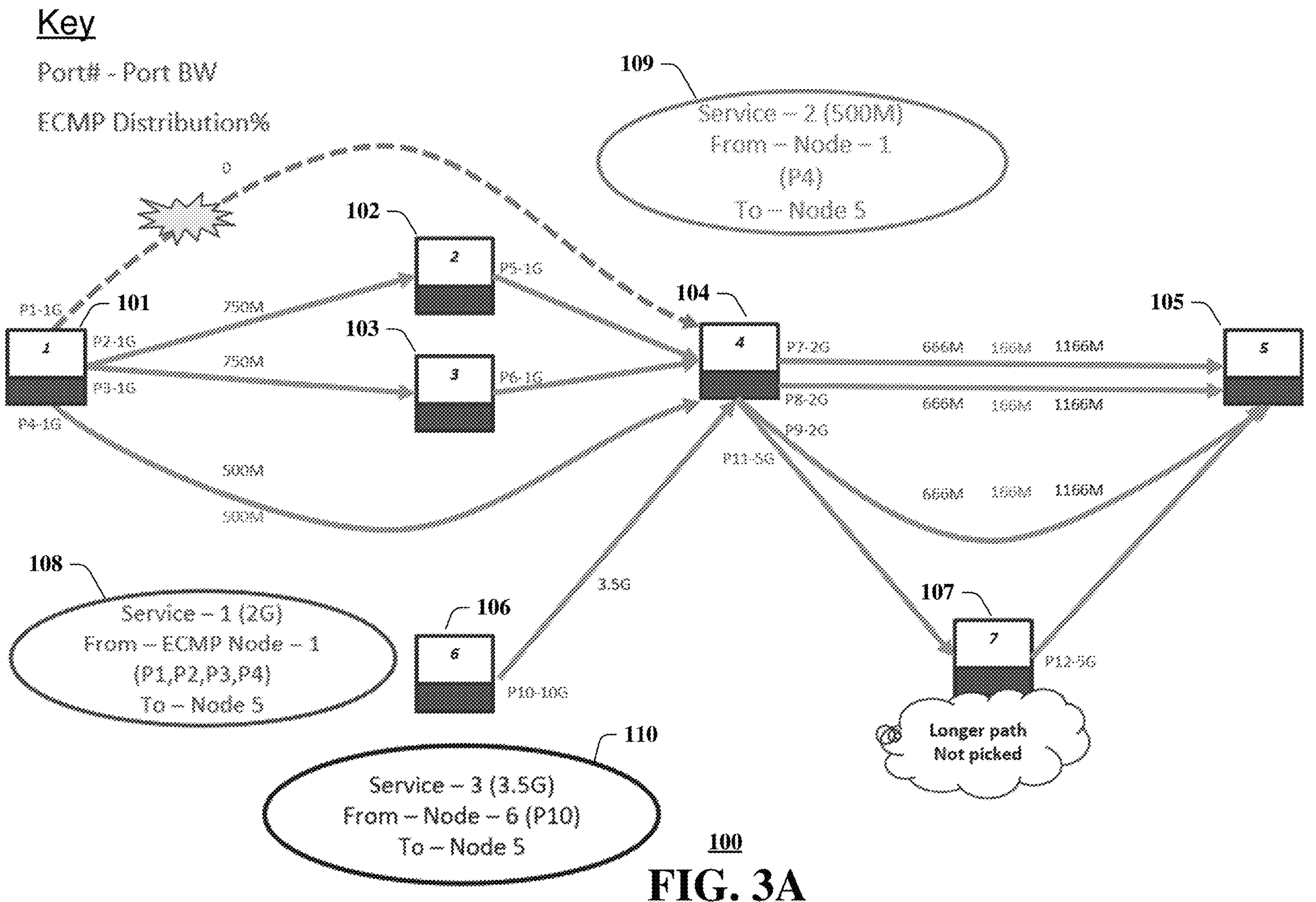
FIG. 3A is a block diagram illustrating an exemplary, non-limiting embodiment of a first fault in a load balanced network functioning in accordance with various aspects described herein.

If a fault occurs on any of outgoing ports 1-3, the traffic for the first service 108 is no longer equally redistributed among the remaining ports. For example, if the link for port 1 fails, then the traffic for the first service 108 will be redistributed as 37.5% on port 2 (750 Mbps), 37.5% on port 3 (750 Mbps), and 25% on port 4 (500 Mbps), thereby preventing the congestion of port 4 illustrated in FIG. 1C. This exemplary failure is illustrated in FIG. 3A below.

FIG. 2C is a block diagram illustrating an exemplary, non-limiting embodiment of a method for avoiding congestion in a load balanced network functioning in accordance with various aspects described herein. With reference to the network 100 shown in FIG. 1D, when the SDN controller registers the third service 110, in method 205 the SDN controller creates a table 206 for the third service 110 at node 104, illustrated in FIG. 2C. Method 205 does not alter any other tables 201, 202 or 204 for the first service 108 or the second service 109.

If a fault occurs on any of outgoing ports 7-9 of node 104, the traffic for the third service 110 is no longer equally redistributed among the remaining ports. For example, if the link for port 7 fails, then the traffic for the third service 110 will be redistributed as 78% on port 8 (2.75 Gbps) and 22% on port 9 (750 Mbps), thereby preventing congestion on port 9.

Figure 3B:
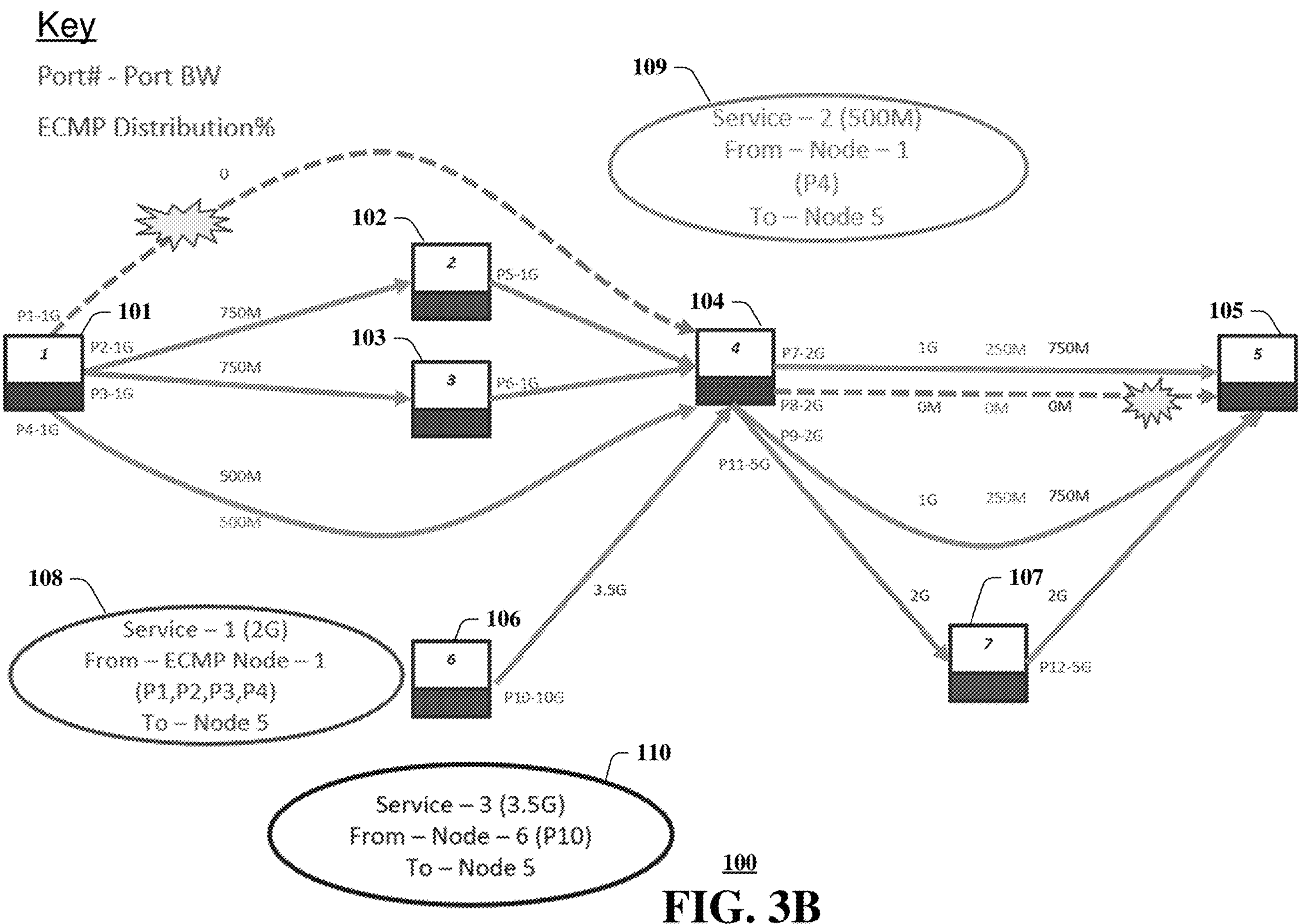
FIG. 3B is a block diagram illustrating an exemplary, non-limiting embodiment of a second fault in a load balanced network functioning in accordance with various aspects described herein.

In another example, if the link for port 8 fails, then the traffic for the third service 110 will be redistributed as 21.5% on port 7 (750 Mbps), 21.5% on port 9 (750 Mbps) and 57% on port 11 (2 Gbps), thereby preventing the congestion on port 9 illustrated in FIG. 1E. This exemplary failure is illustrated in FIG. 3B below.

Figure 2D:
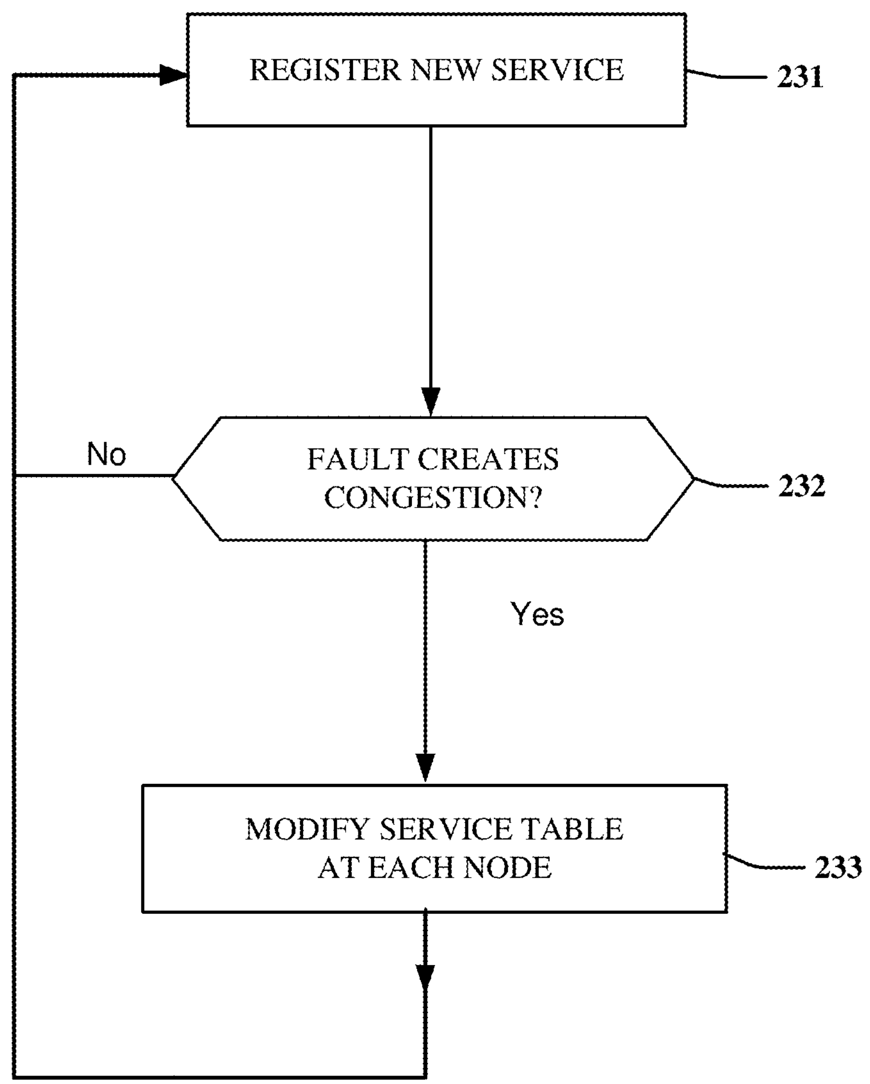
FIG. 2D depicts an illustrative embodiment of a method in accordance with various aspects described herein.

FIG. 2D depicts an illustrative embodiment of a method in accordance with various aspects described herein. As shown in FIG. 2D, method 230 begins at step 231 where the SDN controller receives information for registering a new service in the network. The SDN controller creates a table for each node used by the service and calculates ECMP weights for each of the outgoing ports used by the service. Additionally, the SDN controller determines ECMP weights in the event of a fault of one of the outgoing ports. Next, in step 232, the system determines whether a fault will create congestion in the network. If not, then the process repeats step 231. However, if a fault will create congestion, then at step 233, the SDN controller recalculates weights for each table at nodes where potential congestion may occur, to prevent the potential congestion should a fault occur on a port. In an embodiment, the SDN controller may also determine rows where combinations of faults occur at more than one port or more than one node. In another embodiment, the SDN controller may recalculate tables for the nodes whenever a change in the topology of the network occurs, for example, adding a new link to the network, adding a new node to the network, activating a new port on a node, etc. After the tables have been recalculated, then the process repeats at step 231.

While for purposes of simplicity of explanation, the respective processes are shown and described as a series of blocks in FIGS. 2A, 2B, 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Note, one or more blocks can be performed in response to one or more other blocks. Further, some portions of embodiments can be combined with portions of other embodiments.

FIG. 3A is a block diagram illustrating an exemplary, non-limiting embodiment of a first fault in a load balanced network functioning in accordance with various aspects described herein. As shown in FIG. 3A, a fault occurs on the link from port 1 of node 101 to node 104, then the system implements the corresponding P1 row of table 201B illustrated in FIG. 2B by redistributing the traffic handled by port 1 to ports 2 and 3, which avoids service degradation from congestion on port 4 between node 101 and node 104 shown in FIG. 1D.

FIG. 3B is a block diagram illustrating an exemplary, non-limiting embodiment of a second fault in a load balanced network functioning in accordance with various aspects described herein. As shown in FIG. 3B, a fault occurs on the link from port 8 of node 104 to node 105, then the nodes implement the corresponding P8 rows of tables 201B. 204 and 206 illustrated in FIGS. 2B and 2C to redistribute the traffic and avoid the congestion on port 9 shown in FIG. 1E.

Figure 4:
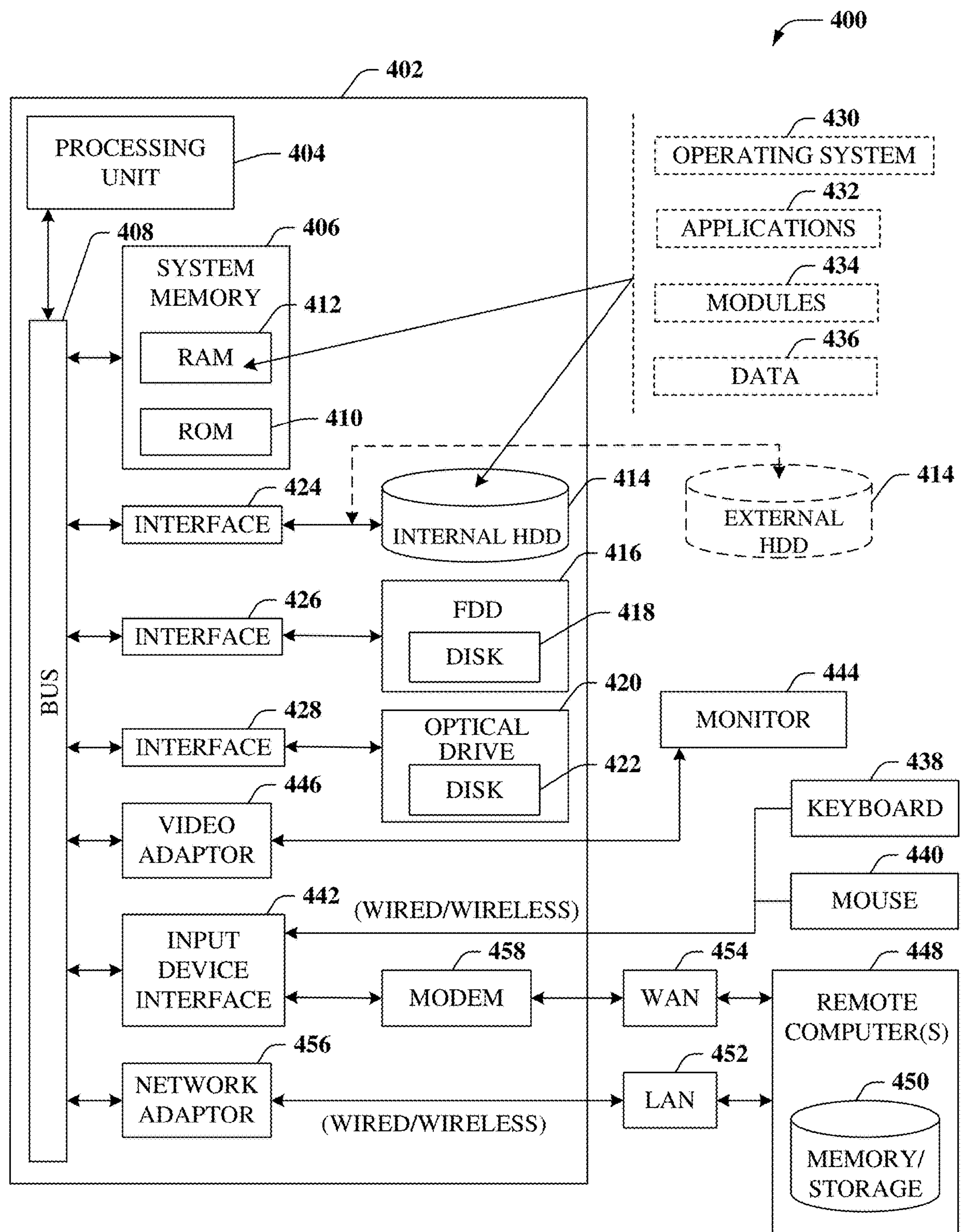
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in computing devices described herein. Each of these devices can be implemented via computer-executable instructions that can run on one or more computers, and/or in combination with other program modules and/or as a combination of hardware and software. For example, computing environment 400 can facilitate in whole or in part the SDN controller and methods described above.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. System memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise high-speed RAM such as static RAM for caching data.

The computer 402 further comprises an internal hard disk drive (HDD 414) (e.g., EIDE, SATA), which internal HDD 414 can also be configured for external use in a suitable chassis (not shown), a magnetic floppy disk drive (FDD 416), (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen and the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. Modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
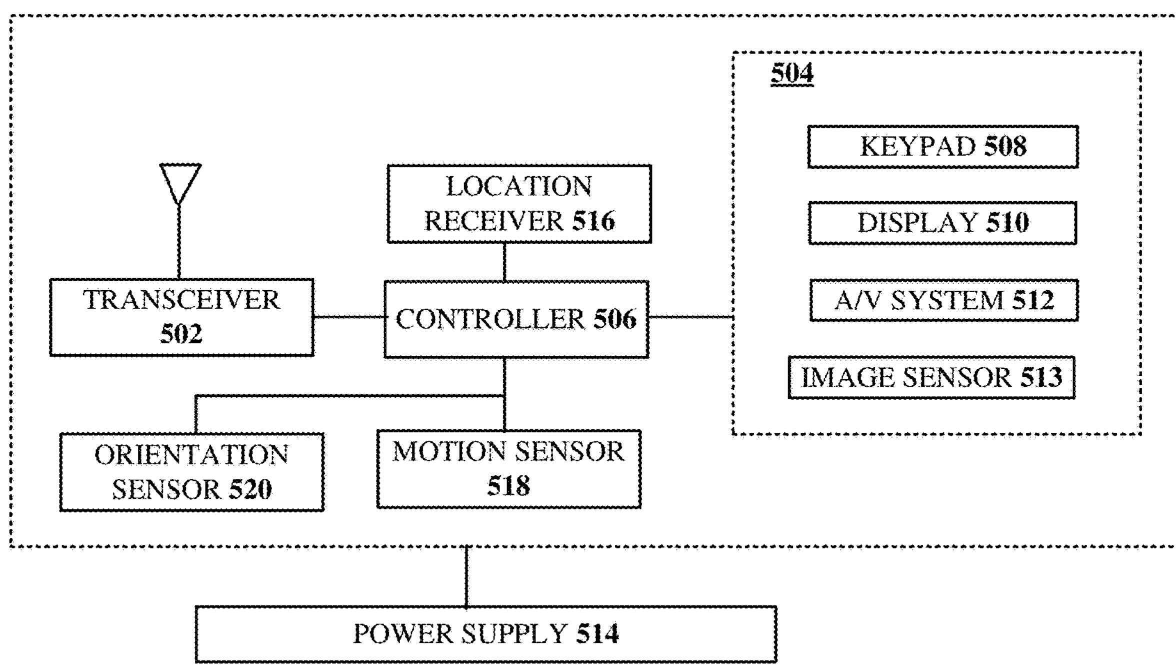
FIG. 5 is a block diagram of an example, non-limiting embodiment of a mobile network platform in accordance with various aspects described herein.

Turning now to FIG. 5, an illustrative embodiment of a communication device 500 is shown. Communication device 500 can facilitate in whole or in part a mobile communication device utilizing the network services described above.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VOIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. Display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human car) and high-volume audio (such as speakerphone for hands free operation). The audio system 512 can further include a microphone for receiving audible signals from an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and cast, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory, machine-readable medium, with executable instructions that, when executed by a processing system including a processor, facilitate performance of operations, the operations comprising:

registering a first service in a network, wherein the network comprises a plurality of nodes, wherein the first service comprises a first capacity of traffic carried over a first plurality of routes between a first source node and a first destination node in the network, and wherein the registering includes creating first tables of weights comprising a table for each node in the first plurality of routes, and wherein the first tables create a first distribution of the first capacity among the first plurality of routes in the first service;

registering a second service in the network including second tables of weights comprising a table for each node in a second plurality of routes between a second source node and a second destination node in the network, wherein the second tables create a second distribution of a second capacity of second traffic among the second plurality of routes for the second service;

determining whether a fault on a link in the network would create congestion in the first plurality of routes and the second plurality of routes; and modifying the first tables of weights or the second tables of weights responsive to determining the congestion.

2. The non-transitory, machine-readable medium of claim 1, comprising:

identifying a change in a topology of the network; and modifying the first tables of weights or the second tables of weights responsive to the identifying.

3. The non-transitory, machine-readable medium of claim 2, wherein the change in the topology comprises adding a new link to the network.

4. The non-transitory, machine-readable medium of claim 1, wherein the first source node is the second source node and the first destination node is the second destination node.

5. The non-transitory, machine-readable medium of claim 2, wherein the change in the topology comprises adding a node to the network, activating a new port on a node in the plurality of nodes, or a combination thereof.

6. The non-transitory, machine-readable medium of claim 1, wherein the operations further comprise: modifying the first tables of weights or the second tables of weights responsive to a change in services provided by the network.

7. The non-transitory, machine-readable medium of claim 6, wherein the change in the services comprises adding a new service to the network.

8. The non-transitory, machine-readable medium of claim 6, wherein the change in the services comprises changing the first capacity of the first service or the second capacity of the second service.

9. The non-transitory, machine-readable medium of claim 1, wherein the operations further comprising:

determining whether a second fault on another link in the network would create the congestion in the first plurality of routes and the second plurality of routes; and modifying the first tables of weights or the second tables of weights responsive to determining the congestion.

10. A method, comprising:

registering, by a processing system including a processor, a first service in a network comprising a plurality of nodes, wherein the first service comprises a first capacity of traffic carried over a first plurality of routes between a source node and a destination node, and wherein the registering comprises creating first tables of weights comprising a table for each node in the first plurality of routes, wherein the first tables create a first distribution of the first capacity among the first plurality of routes in the first service;

registering, by the processing system, a second service in the network including a second tables of weights comprising a table for each node in a second plurality of routes between a second source node and a second destination node in the network, wherein the second tables create a second distribution of a second capacity of traffic among the second plurality of routes for the second service;

determining, by the processing system, whether a fault on a link in the network would create congestion in the first plurality of routes and the second plurality of routes; and modifying, by the processing system, the first tables of weights or the second tables of weights responsive to determining the congestion.

11. The method of claim 10, comprising:

identifying, by the processing system, a change in a topology of the network; and modifying, by the processing system, the first tables of weights or the second tables of weights responsive to the identifying.

12. The method of claim 11, wherein the change in the topology comprises adding a new link to the network.

13. The method of claim 11, wherein the change in the topology comprises adding a node to the network.

14. The method of claim 11, wherein the change in the topology comprises activating a new port on a node in the plurality of nodes.

15. The method of claim 10, further comprising: modifying, by the processing system, the first tables of weights or the second tables of weights responsive to a change in services provided by the network.

16. The method of claim 15, wherein the change in the services comprises adding a new service to the network.

17. The method of claim 15, wherein the change in the services comprises changing a capacity of the first service or changing the capacity of the second service.

18. The method of claim 10, further comprising:

determining, by the processing system, whether a second fault on another link in the network would create the congestion in the first plurality of routes and the second plurality of routes; and modifying, by the processing system, the first tables of weights or the second tables of weights responsive to determining the congestion.

19. A network controller, comprising:

a processing system including a processor; and a memory that stores executable instructions that, when executed by the processing system, facilitate performance of operations, the operations comprising:

registering a first service in a network comprising a first plurality of nodes, wherein the first service comprises a first capacity of traffic carried over a first plurality of routes between a source node and a destination node, and wherein the registering comprises creating first tables of weights including a table for each node in the first plurality of routes, wherein the first tables define for a first distribution of the first capacity among the first plurality of routes in the first service;

registering a second service in the network including second tables of weights, including a table for each node in a second plurality of routes, wherein the second tables define a second distribution of a second capacity of second traffic among the second plurality of routes for the second service;

determining whether a fault on a link in the network would create congestion in the first plurality of routes and the second plurality of routes; and modifying the first tables of weights or the second tables of weights responsive to determining the congestion.

20. The network controller of claim 19, wherein the processing system comprises a plurality of processors operating in a distributed computing environment.

* * * * *